(12) United States Patent
Chu et al.

(10) Patent No.: US 11,461,422 B2
(45) Date of Patent: Oct. 4, 2022

(54) PAGE PERSONALIZATION

(71) Applicant: Citrix Systems, Inc., Fort Lauderdale, FL (US)

(72) Inventors: Xiaolu Chu, Nanjing (CN); Ze Chen, Nanning (CN); Zongpeng Qiao, Nanjing (CN); Ke Xu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 224 days.

(21) Appl. No.: 16/887,158

(22) Filed: May 29, 2020

(65) Prior Publication Data

US 2021/0349961 A1 Nov. 11, 2021

Related U.S. Application Data

(63) Continuation of application No. PCT/CN2020/088995, filed on May 7, 2020.

(51) Int. Cl.
*G06F 16/00* (2019.01)
*G06F 16/9536* (2019.01)
*G06F 21/41* (2013.01)
*G06F 16/9538* (2019.01)

(52) U.S. Cl.
CPC ...... *G06F 16/9536* (2019.01); *G06F 16/9538* (2019.01); *G06F 21/41* (2013.01)

(58) Field of Classification Search
CPC ... G06F 16/9536; G06F 16/9538; G06F 21/41
See application file for complete search history.

(56) References Cited

U.S. PATENT DOCUMENTS

| | | | |
|---|---|---|---|
| 7,346,606 B2* | 3/2008 | Bharat | H04L 51/32 707/999.005 |
| 8,955,080 B2* | 2/2015 | Brunswig | H04L 63/0815 726/8 |
| 2005/0137939 A1* | 6/2005 | Calabria | G06Q 30/0601 705/26.1 |
| 2010/0070507 A1* | 3/2010 | Mori | G06F 16/9535 707/E17.014 |

(Continued)

FOREIGN PATENT DOCUMENTS

CN 104881484 A 9/2015

OTHER PUBLICATIONS

PCT International Search Report and Written Opinion dated Feb. 5, 2021 for International Application No. PCT/CN2020/088995; 9 pages.

*Primary Examiner* — Hung Q Pham
(74) *Attorney, Agent, or Firm* — Daly, Crowley, Mofford & Durkee, LLP

(57) ABSTRACT

Techniques are disclosed for providing personalized pages. An example methodology implementing the techniques includes, displaying, by a computing device, a plurality of elements in a page and monitoring interaction with the displayed page. The method also includes, responsive to determining a topic based on the interaction with the plurality of elements in the displayed page, identifying one or more files related to the identified topic and providing an element on the page, the element configured to provide access to one of the identified one or more files in response to an input received on the element. The element may be provided in a file zone in the displayed page.

16 Claims, 13 Drawing Sheets

(56) References Cited

U.S. PATENT DOCUMENTS

2013/0132357 A1  5/2013  Edgar et al.
2014/0195507 A1  7/2014  Ricket et al.
2017/0228459 A1  8/2017  Wang et al.

* cited by examiner

PAGE PERSONALIZATION

CROSS REFERENCE TO RELATED APPLICATION

This application is a continuation of and claims the benefit of PCT Patent Application No. PCT/CN2020/088995 filed on May 7, 2020 in the English language in the State Intellectual Property Office and designating the United States, the contents of which are hereby incorporated herein by reference in its entirety.

BACKGROUND

Due, at least in part, to the growth of networks, such as the Internet and the World Wide Web (commonly known as the Web) more and more content is available to more and more people. For example, it is not uncommon for a keyword query on the Internet to return a search engine results page (SERP) that is several pages in length and includes a large number of uniform resource locators (URLs or "links").

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include displaying, by a computing device, a plurality of elements in a page, and monitoring, by the computing device, interaction with the displayed page. The method may also include, responsive to determining, by the computing device, a topic based on the interaction with at least one of the plurality of elements in the displayed page, identifying one or more files related to the identified topic, and providing an element on the page, the element configured to provide access to one of the identified one or more files in response to an input received on the element.

According to another illustrative embodiment provided to illustrate the broader concepts described herein, a system includes a memory and one or more processors in communication with the memory. The processor may be configured to display a plurality of elements in a page, monitor interaction with the displayed page, and, responsive to determination of a topic based on the interaction with the displayed page, identify one or more files related to the identified topic, and provide an element on the page, the element configured to provide access to one of the identified one or more files in response to an input received on the element.

According to another illustrative embodiment provided to illustrate the broader concepts described herein, a method may include displaying, by a computing device, a plurality of elements in a page, at least one element of the plurality of elements configured to provide access to a subpage of the page, retrieving, by the computing device from a file services connector, at least one filename of at least one file via the element, and displaying, by the computing device, the at least one filename of the at least one file in the displayed page such that contents of the at least one file is accessible in response to input received on the at least one filename.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

With the vast amounts of Internet and Web content available to a user, it may be difficult and time consuming for the user to sort through such content to determine what may be of interest.

Concepts, devices, systems, and techniques are disclosed for providing pages that are personalized for a user based on learned user interests in interacting with the pages. The personalization is achieved by monitoring user behavior using or otherwise interacting with a page to learn the user's interests, and dynamically modifying the page based on the learned interests. In some embodiments, when a user opens a page, such as a Software as a Service (SaaS) application page, the filenames mentioned or quoted on the page or subpages of the page are identified and listed in a file zone in the page. The user's behavior using the page may be then monitored to learn the user's focus on a topic, and the contents of the file zone (e.g., the filenames listed in the file zone) revised based on the learned focus topic. Additionally or alternatively, the user's behavior interacting with the contents of the file zone may be then monitored to learn the user's preference, and recommended content based on the learned user preference listed in the file zone or in another file zone in the page. In some embodiments, the recommended content may be obtained from third-party applications which are accessible via a single sign-on (SSO) of the user. These and other advantages, variations, and embodiments will be apparent in light of this disclosure.

As used herein, the term "page" refers broadly, in addition to its plain and ordinary meaning, to a collection of information. A page contains content, such as, by way of example and not a limitation, text, graphics, audio, video, documents (sometimes referred to as "files"), and hyperlinks (sometimes referred to more simply as "links") to other pages and documents and elements of other pages and documents. A page is identified by a distinct address, such as a Uniform Resource Locator (URL). For example, when a user inputs an address into a browser application running on a computing device, the browser application downloads the addressed page's elements from servers and transforms the elements into an interactive visual representation of the page on the computing device. The servers may be web servers or application servers that host applications, such as web applications and SaaS applications, to provide a couple examples.

Figure 1:
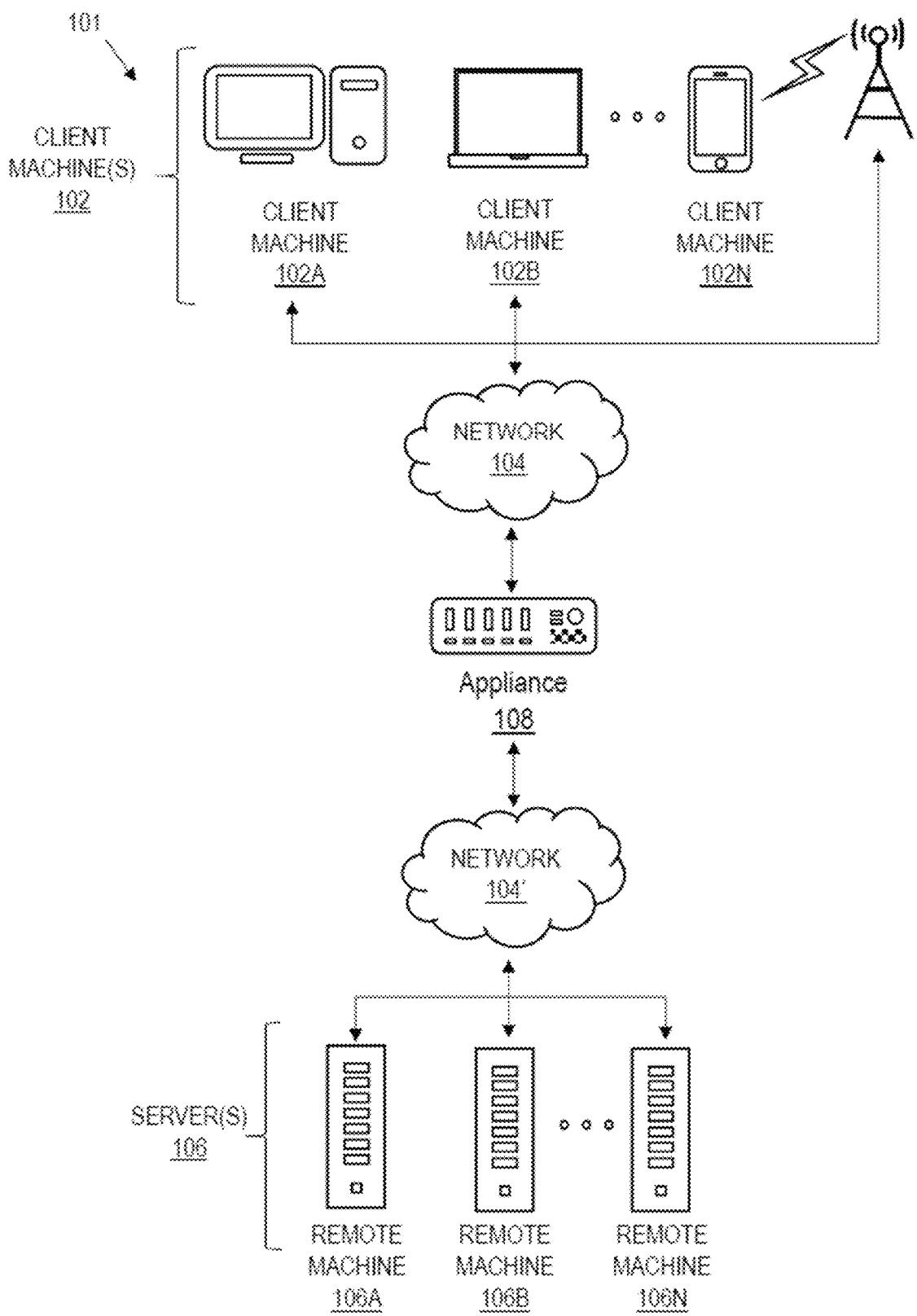
FIG. 1 is a diagram of an illustrative network computing environment in which embodiments of the present disclosure may be implemented.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
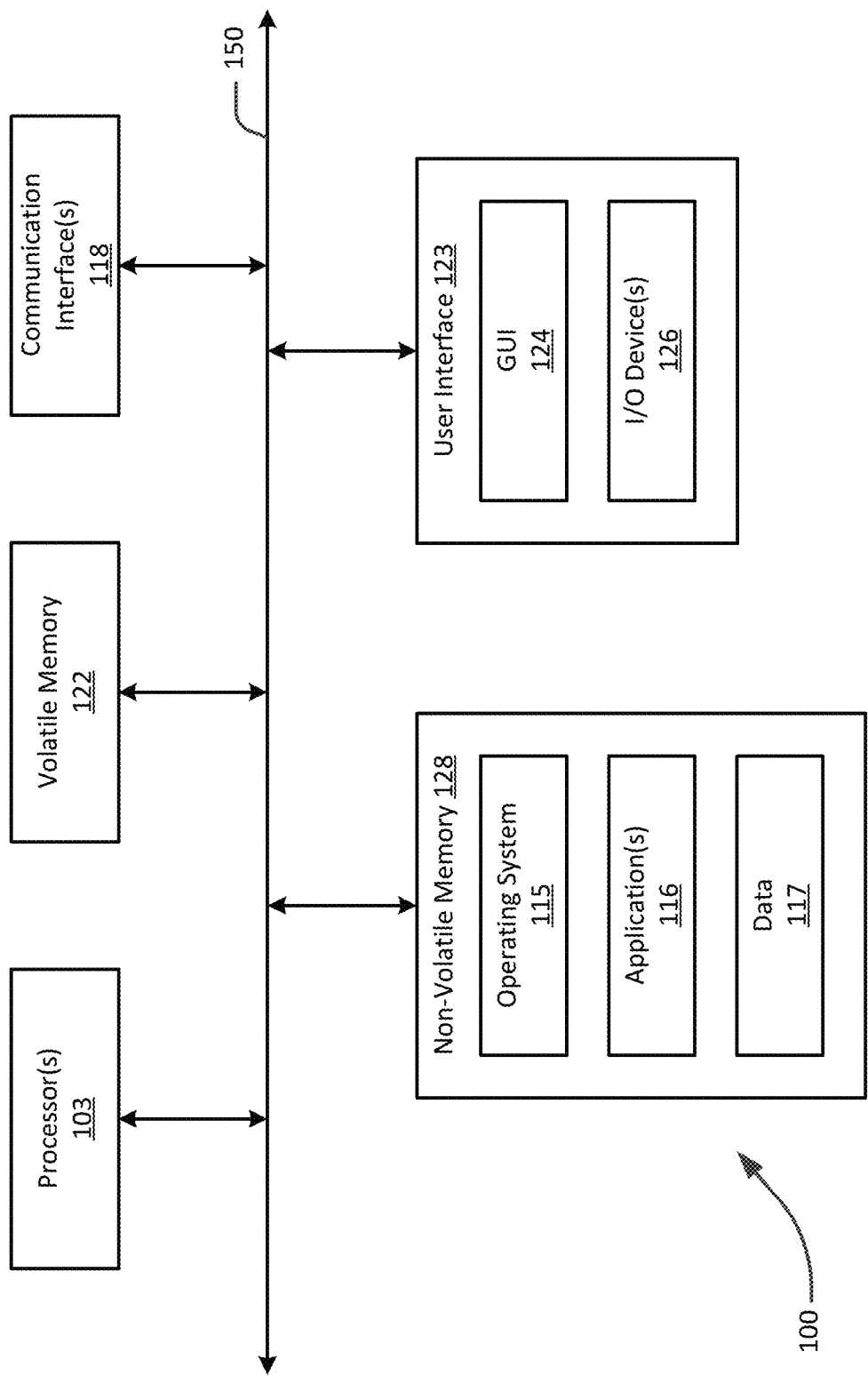
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
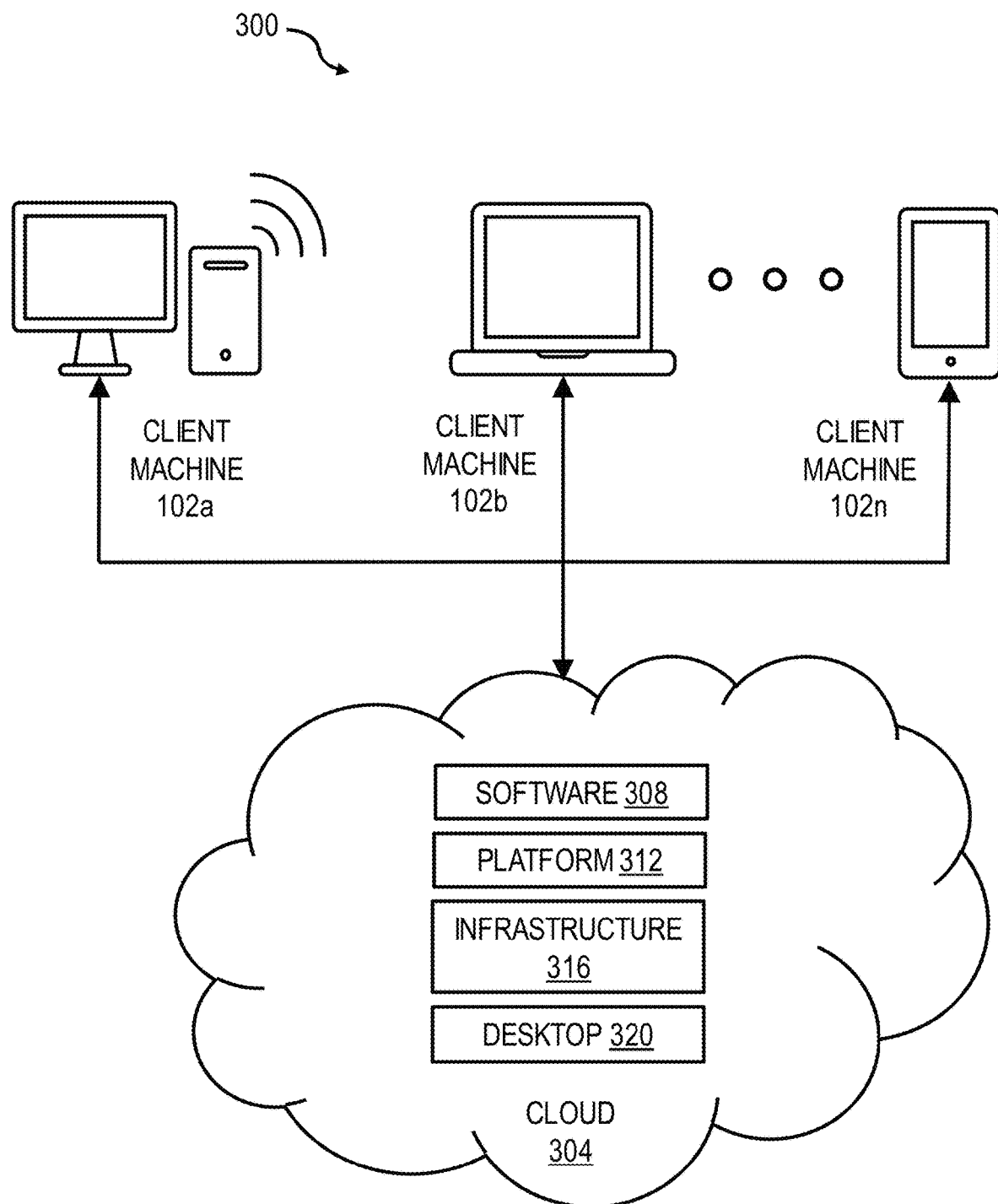
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS)

308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g., Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
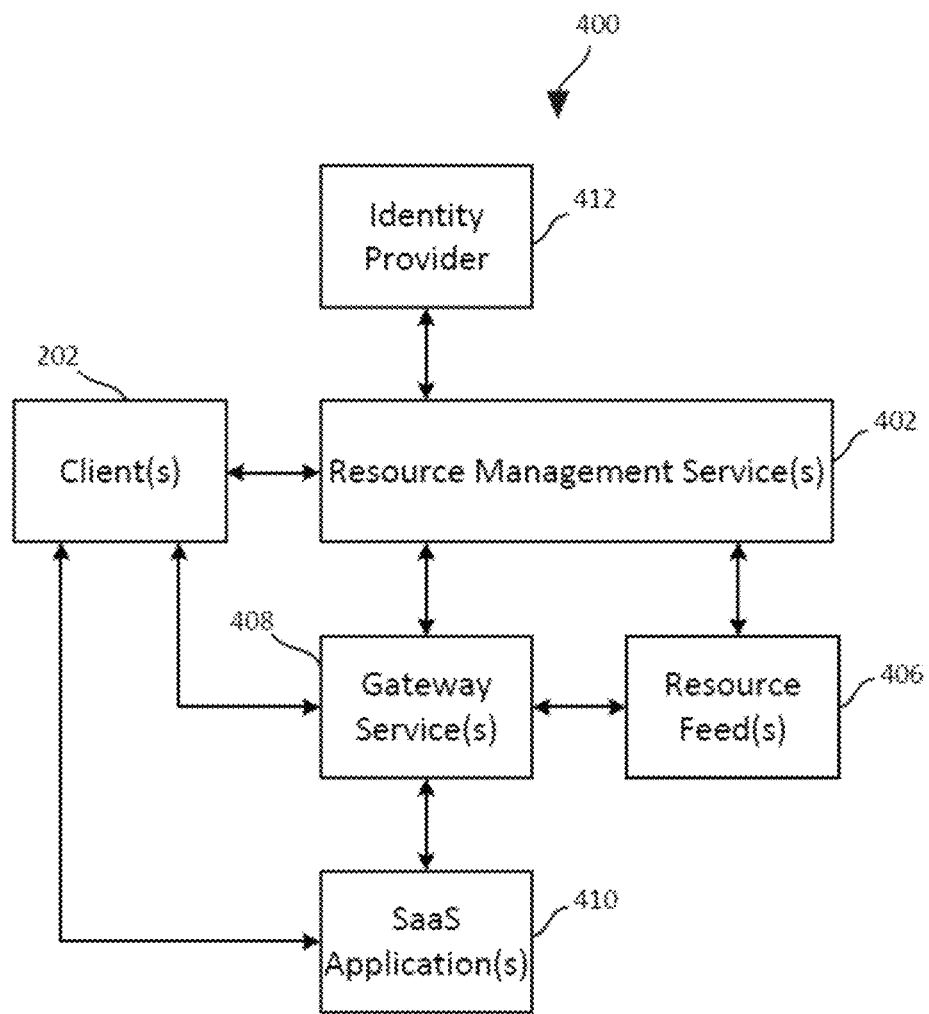
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
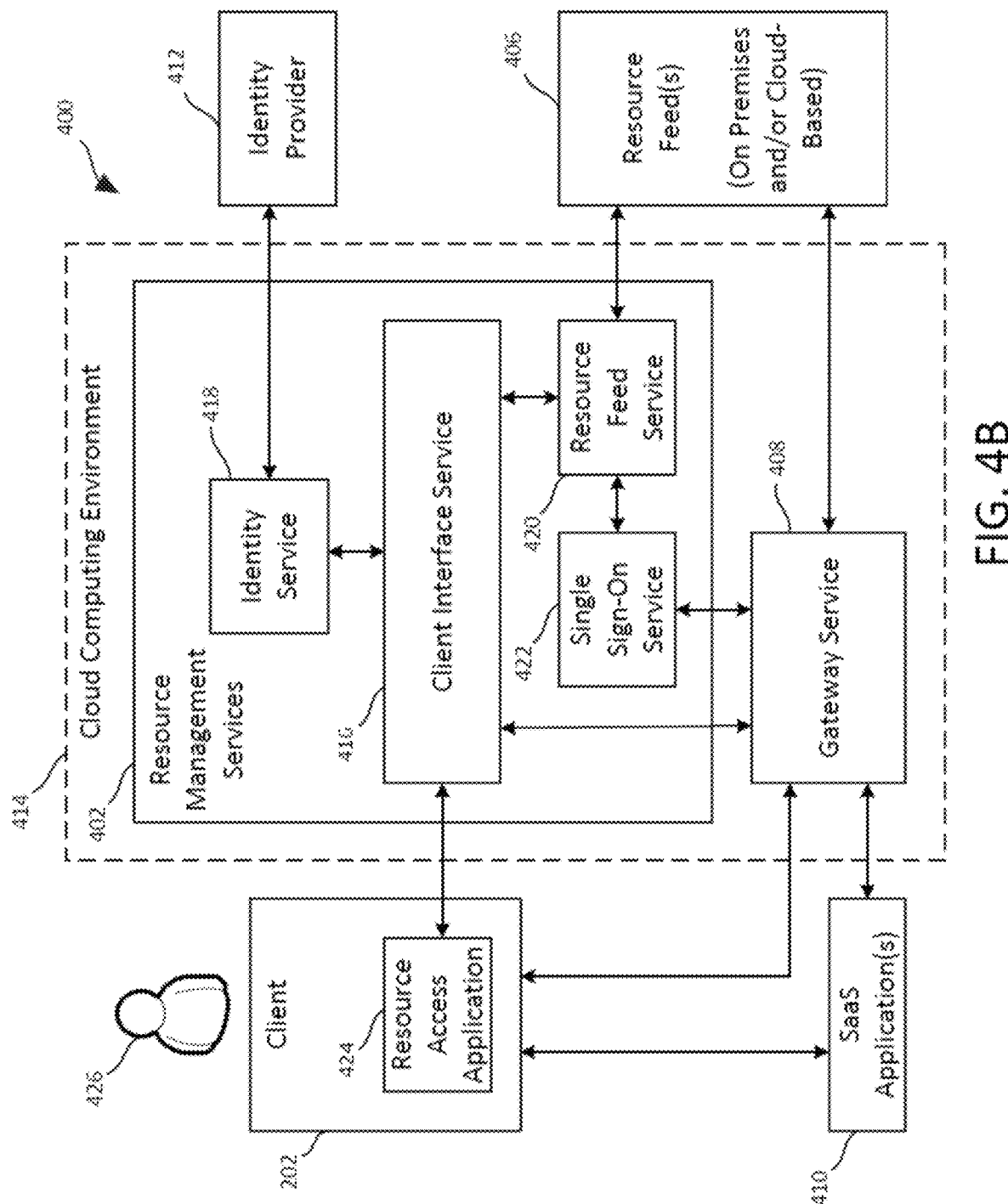
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource access application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link.

For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
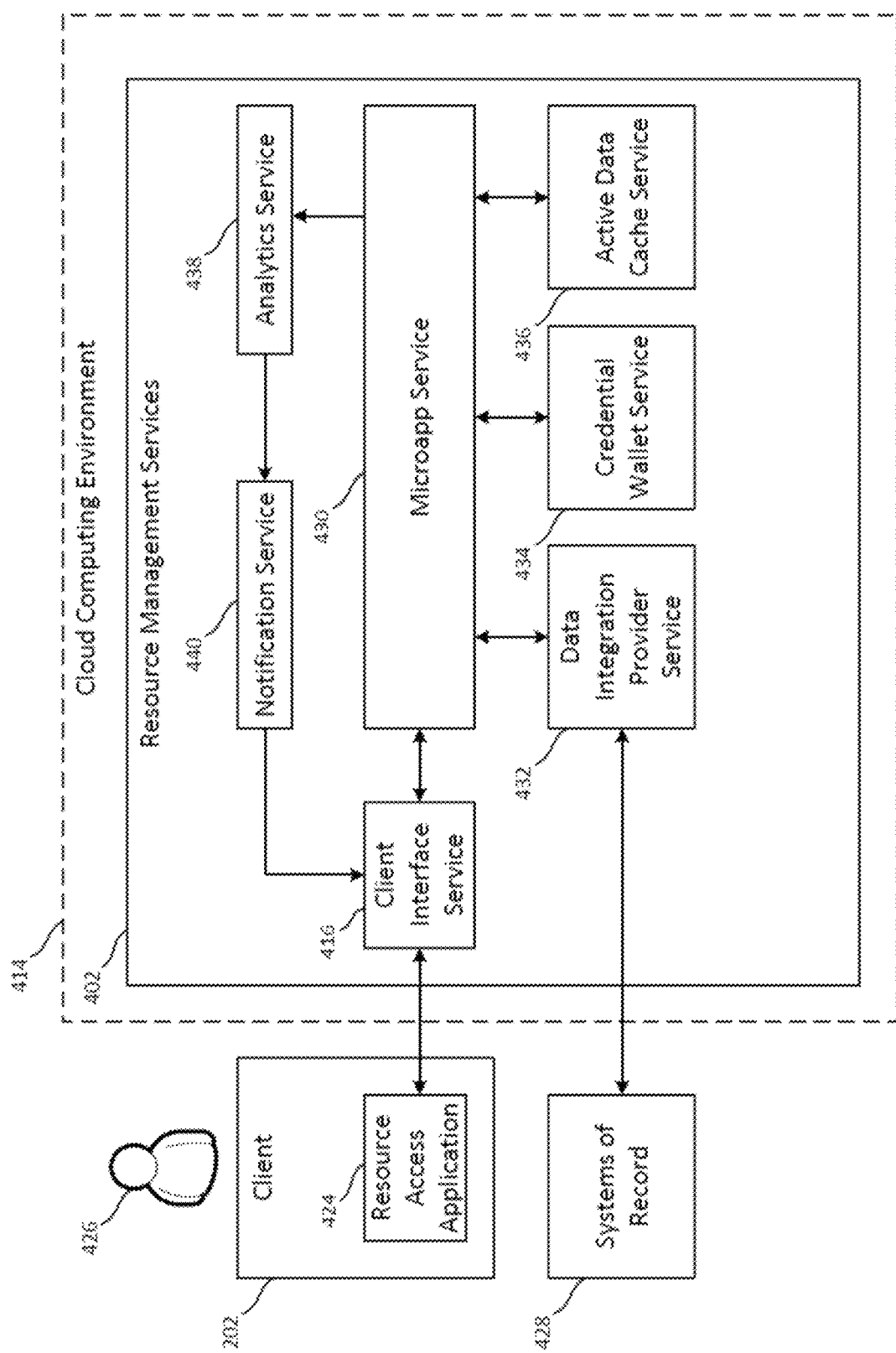
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
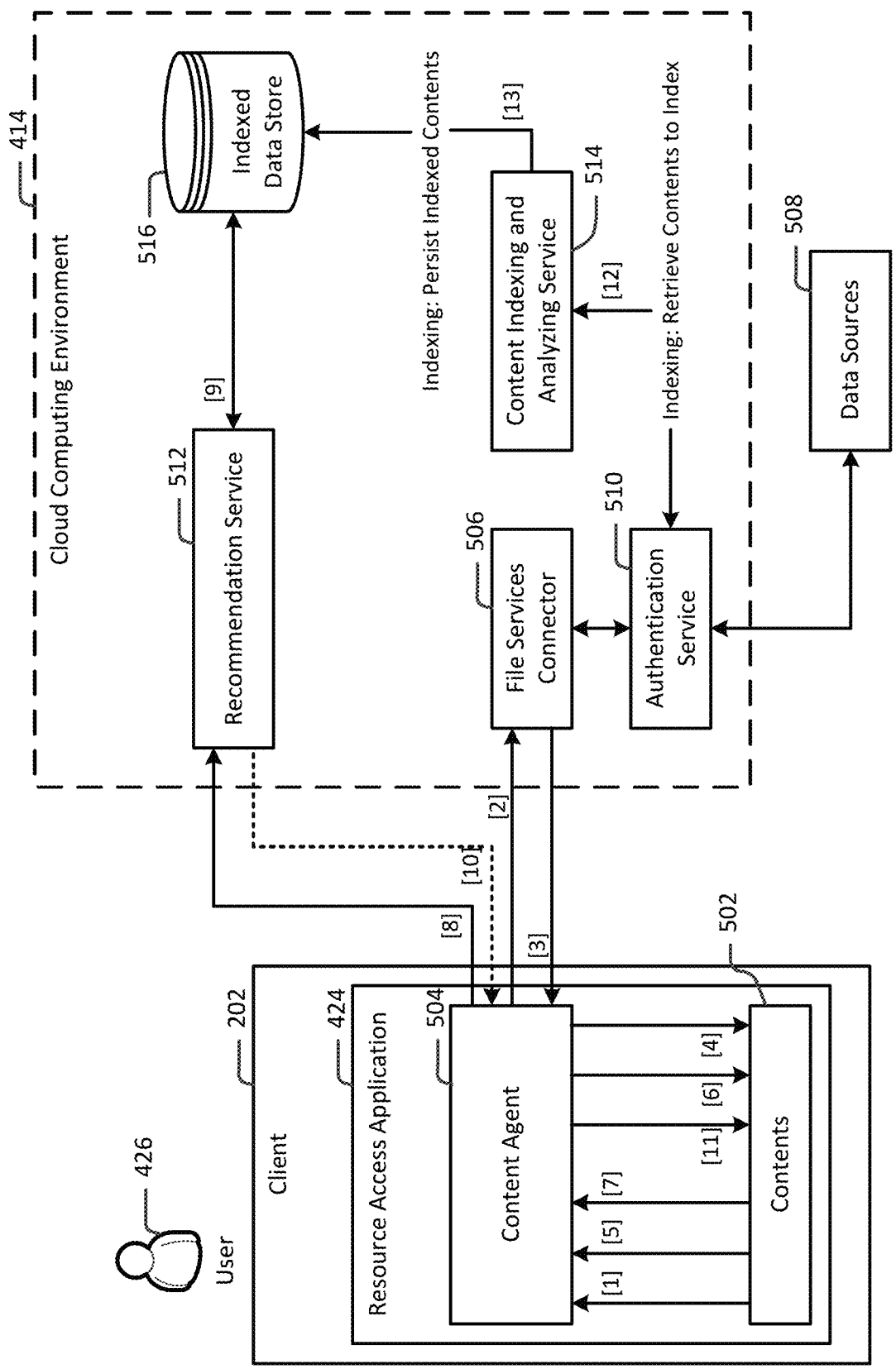
FIG. 5 is a block diagram of a system that can be used to provide pages that are personalized for a user based on learned user interests in interacting with the pages, in accordance with an embodiment of the present disclosure.

FIG. 5 is a block diagram of a system that can be used to provide pages that are personalized for a user based on learned user interests in interacting with the pages, in accordance with an embodiment of the present disclosure. The system has a topology which enables a user, such as user 426, to leverage services provided by resource access application 424 and cloud computing environment 414. For example, as described previously, in some embodiments, resource access application 424 and associated components may provide user 426 with a personalized interface enabling rapid (and ideally instant) and seamless access to all the user's SaaS and web applications, files, virtual Windows applications, virtual Linux applications, desktops, mobile applications, Citrix Virtual Apps and Desktops™, local applications, and other data. To facilitate page personalization, resource access application 424 may receive information related to a user's behavior on (or interaction with) a page and analyze or otherwise process the information to learn or otherwise determine focus topics and/or preferences of the user. Resource access application 424 may personalize the page based upon the determined focus topics and/or preferences of the user.

For example, as shown in FIG. 5, user 426 may use resource access application 424 running on client 202 to open a page, such as a SaaS application page. When user 426 opens the page, resource access application 424 may obtain contents 502 of the page to render the page on a display of client 202. A content agent 504 of resource access application 424 may then extract links [1] (such as links to files and file folders, to provide a couple of examples) that are in contents 502. In an implementation, content agent 504 can extract the links from contents 502 using an appropriate processing scheme such as text pattern matching. For example, in the case of a HyperText Markup Language (HTML) element, the link can be extracted from the href attribute in the <a> tag (anchor). In the case of other types of elements, content agent 504 can check or otherwise process an element for specific or known sequences of characters that represent links.

Upon extracting the links from contents 502, content agent 504 may send a request [2] to a file services connector 506 of cloud computing environment 414 for file information (e.g., such as filenames, applications providing the files, types of files, sizes of the files, and other data regarding the files) based on the links. Content agent 504 may send or otherwise provide to file services connector 506 some or all of the extracted links (or portions of the extracted links) accompanied by the request for the file information. Upon receiving the request, file services connector 506 can follow the links (e.g., click or tap on the links) to determine file information of the files and file folders pointed to or referenced by the links. File services connector 506 can then send or otherwise provide the file information to content agent 504.

In the example embodiment of FIG. 5, the links may point to or reference files and file folders provided by data sources 508. Non-limiting examples of data sources 508 include any information sharing platform including but not limited to video sharing platforms (e.g., YouTube™), software hosting platforms (e.g., GitHub®), online training platforms (e.g., Pluralsight®), as well as email servers, and other information sources.

In some embodiments, file services connector 506 can determine or verify (or check) that the files and file folders pointed to or referenced by the links exist and are accessible via the links. In this context, a link that points to or references a file or file folder that exists can be considered a live link as compared to a dead link which is a link that points to or references a file or file folder that either no longer exists or is inaccessible (i.e., the referenced file or file folder has been deleted or moved).

If file services connector 506 determines that a link is a live link, file services connector 506 can include the filename of the file (e.g., name of the file pointed to or referenced by the link) and other metadata of the document in the file information. Otherwise, if file services connector 506 determines that a link is a dead link, file services connector 506 does not include information regarding the dead link in the file information.

In an embodiment, file services connector 506 can use an authentication service 510 of cloud computing environment 414 to authenticate user 426. For example, a file pointed to or referenced by a link may require authentication credentials to be accessed. In this case, file services connector 506 can use authentication service 510 to check that user 426 is authorized to access the file based on authentication of user 426 (i.e., based on the user's authentication credentials). For example, the link may point to a file in a publication service that requires a user to provide authentication credentials (e.g., username and password) before authorizing access to the file upon successful authentication of the user. As another example, the link may point to a file that is an attachment to an email on an email server. In this case, the email service may require authentication credentials before providing access to the email and the file attached to the email. In some embodiments, authentication service 510 may provide user 426 with secure access and single sign-on to virtual, SaaS, and web applications.

Upon receiving [3] the file information, content agent 504 may re-render [4] the page based on the received file information and display a file zone on the re-rendered page. One example of such a re-rendered page including a file zone will be described in detail below in conjunction with FIG. 6 (i.e., file zone 602 on re-rendered page 600 in FIG. 6). Suffice it here to say that upon such re-rendering, the page includes a file zone in which may be displayed some or all of the file information received from file services connector 506. Items (or elements) listed in the file zone may comprise filenames of files that are mentioned or quoted on a page. In embodiments, elements in a file zone may comprise links that point to or reference corresponding files. Displaying elements as links in this manner allows a user (e.g., user 426) to click or tap any item in the file zone to directly access the corresponding file without having to scroll through the contents of a page to find a link. In this manner, displaying and providing direct access to files mentioned or quoted in a page or on the subpages of a page provide user 426 an improved user experience.

In some embodiments, content agent 504 may then detect, gather information on or otherwise monitor [5] one or more behaviors/interactions of user 426 with the page (e.g., page 600 in FIG. 6) to learn or otherwise determine the topic or topics on which user 426 is focused. Non-limiting examples of user interactions with a page include scrolling and highlighting specific content (e.g., text, images, etc.) in a page, searching for specific content (e.g., via the Ctrl-F command) in a page, moving or hovering a pointer over specific content, touching specific content, and using a shortcut provided in a page. Content agent 504 can learn or determine a focus topic or topics based on the monitored behavior/interactions of user 426 in using or otherwise interacting with the page. For example, if user 426 highlights the word "politics" in the contents of a page, content agent 504 can determine that the focus topic of user 426 is content related to politics based on the monitored behavior (with the monitored behavior in this example including the user action of highlighting the word "politics"). As another example, if user 426 clicks or taps a shortcut element to contents related to a specific conference in page 600, content agent 504 can determine that the focus topic of user 426 is in the specific conference based on the monitored behavior (with the monitored behavior in this example including the user action of clicking a shortcut element). As still another example, if user 426 searches for engineering content in a page, content agent 504 can determine that the focus topic of user 426 is content related to engineering based on the monitored behavior (with the monitored behavior in this example including the user action of clicking a shortcut element). In any case, content agent 504 can monitor the behavior of user 426 in interacting with the contents of page 600 to learn or otherwise determine a focus topic.

Upon determining a focus topic, content agent 504 may filter [6] the contents of a file zone to emphasize the filenames of files whose contents are related to the determined focus topic. In an implementation, content agent 504 may be programmed or otherwise configured to filter the contents of the files indicative of the filenames in a file zone using a term frequency-inverse document frequency (tf-idf) equation, $$w_{i,j} = tf_{i,j} \times \log\left(\frac{N}{df_i}\right)$$

in which:

$w_{i,j}$ is the tf-idf score;

$tf_{i,j}$ is the frequency of occurrences of a word (e.g., focus topic);

$df_i$ is the number of files containing the word; and

N is the total number of files.

The tf-idf may be used to filter out the files that are not relevant to the focus topic. For example, in the case where a user searches for a specific term, tf-idf may be used to filter out the files whose contents do not include the specific term searched or whose contents include a low number of occurrences of the specific term searched.

Examples of filtered file zones will be described in detail below in conjunction with FIGS. 7 and 8.

In some embodiments, content agent 504 may detect, gather information on or otherwise monitor [7] one or more behaviors/interactions of user 426 in interacting with the contents of a file zone to learn the preference of user 426 with regard to the filenames (i.e., the files indicative of the filenames) listed in the file zone. For example, user 426 may click or tap a filename listed in a file zone to access the contents of the file identified by the filename. As another example, user 426 may highlight or otherwise emphasize a filename or a portion of a filename listed in a file zone. In any case, content agent 504 can monitor the behavior of user 426 in interacting with a file zone to learn the preference of user 426 with regard to the files identified by the filenames listed in a file zone. Non-limiting examples of preferences include files from a specific origin location (e.g., preference for files located in Dropbox, Sharefile, etc.), preference for a specific type of file, such as videos, presentation slide decks, demonstration files, and text files, to name a few examples, and past actions of the user.

Upon learning or otherwise determining the preference of user 426 for a filename listed in a file zone, content agent 504 may send a request [8] to a recommendation service 512 of cloud computing environment 414 for related files to recommend to user 426. The request may be for filenames of files related to the learned preference of user 426. Content agent 504 may send or otherwise provide to recommendation service 512 an indication of the determined or learned preference of user 426 to file services connector 506 with the request for filenames of files related to the preference of user 426. Such an indication of the determined or learned preference of user 426 may be, for example, the interacted filename and/or the interacted portion of the filename from the file zone. In some cases, content agent 504 may also send or otherwise provide to recommendation service 512 an indication of the focus topic learned or determined from monitoring the behavior of user 426 in interacting with a page. For instance, content agent 504 may send or otherwise provide to recommendation service 512 the filenames listed in a file zone. Upon receiving the request, recommendation service 512 can determine the files that are related to the preference of user 426 and for recommending to user 426.

In some embodiments, recommendation service 512 may identify the files to recommend to user 426 from SaaS and web applications that are accessible under the single sign-on (SSO) of user 426. In other words, the files to recommend to user 426 may be from SaaS and web applications that are accessible under the SSO scheme used by user 426 to access the application that is providing the page being viewed or otherwise interacted with by a user (e.g., user 426). In an implementation, recommendation service 512 may be programmed or otherwise configured to determine files to recommend using an item collaborative filtering (ItemCF) equation, $$P_{uj} = \sum_{i \in N(u) \cap S(i,k)} w_{ji} r_{ui}$$

in which:

u is an integer which serves as index assigned to a user such that u=1 refers to a first user, u=2 refers to a second user and so-on and so-forth;

j is an integer which serves as index assigned to a file such that j=1 refers to a first file, j=2 refers to a second file and so-on and so-forth;

$P_{uj}$ is a quantity representing the interest of user u to file j,

N(u) is a list of user's interest files,

S(i,k) is a list of files, limited to a size k, that are similar to file i, $w_{ji}$ is a quantity representing the similarity between file i and file j, and $r_{ui}$ is a quantity representing the interest of user u to file i.

For example, ItemCF provides for determining the similarity of file j and user u. Then, if the similarity between file i and file j is greater than the similarity between file a and file j, then, as between file i and file a, file i can be recommended to user u based on ItemCF.

In some embodiments, recommendation service 512 may provide to content agent 504 a ranked or ordered list of filenames of recommended files based on relevancy to the focus topic of user 426. In an implementation, recommendation service 512 can rank the recommended files based on a similarity between the contents of the recommended files and the focus topic (e.g., the contents of the files identified by the filenames listed in a file zone). For example, the similarity may be computed using the cosine similarity equation, $$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

in which:

A and B are term frequency vectors of the files;

$A_i$ are components of vector A; and $B_i$ are components of vector B.

One example of a ranked or ordered list of filenames of recommended files based on relevancy to the focus topic of user 426 is described below in conjunction with FIG. 9.

As shown in FIG. 5, content agent 504 may receive [10] from recommendation service 512 a list of filenames of files to present or recommend to user 424. In some embodiments, the list of filenames may be a ranked list based on relevance to the learned focus topic and preference of user 424. Upon receiving the recommended filenames, content agent 504 may re-render [11] a page to display the recommended filenames. In an implementation, the recommended filenames may be listed in a portion of the page (e.g., a file zone), which may be an existing file zone, (such as file zone 602 in FIG. 6), or a different file zone. One example will be described below in conjunction with FIG. 10.

As explained above in conjunction with FIG. 5, upon receiving file information, a content agent may re-render a page (e.g., content agent 504 at [4]) based upon the received file information. In some embodiments, and referring now to FIG. 6, a re-rendered page 600 includes elements 606, 608a-608e, and 610a-610e, and a file zone 602 among other elements. For example, element 606 may be a heading ("Sales Training Event Q2, 2018: Santa Clara") that indicates a topic of the contents of page 600. Elements 608a-608e may be subheadings under the topic heading that indicate subtopics of page 600. Elements 610a-610e may be links to subpages under the subheadings. For example, as depicted, element 610a is a link to a subpage "https://acme.fileshare.com/docs/123-abc-4d5e6f" under subheading element 608a "All decks provided can be found here:", element 610b is a link to a subpage "https"//conference.fileshare.com/xxyy-9876-mnbvcxz" under subheading element 608b "All live demo recordings can be found here:", element 610c is a link to a subpage "https://abc.com/aforms/202004301234" under subheading 608c "PLEASE COMPLETE THIS SHORT POST-EVENT SURVEY ASAP:", element 610d is a link to a subpage "https://docs.google.com/docsheet/s/wert-09876-lkj123" under subheading 608d "Next Horizon Product Design List:", and element 610e is a link to a subpage "https://docs.google.com/forms/h/hjye-5578-2scfWINTE_00f78" under subheading 608e "Next Horizon Product Design Submission Form:". Page 600 may also include other elements such as a title bar, menu bar, search box, and shortcuts, that may be within or outside the viewable area of page 600.

Figure 6:
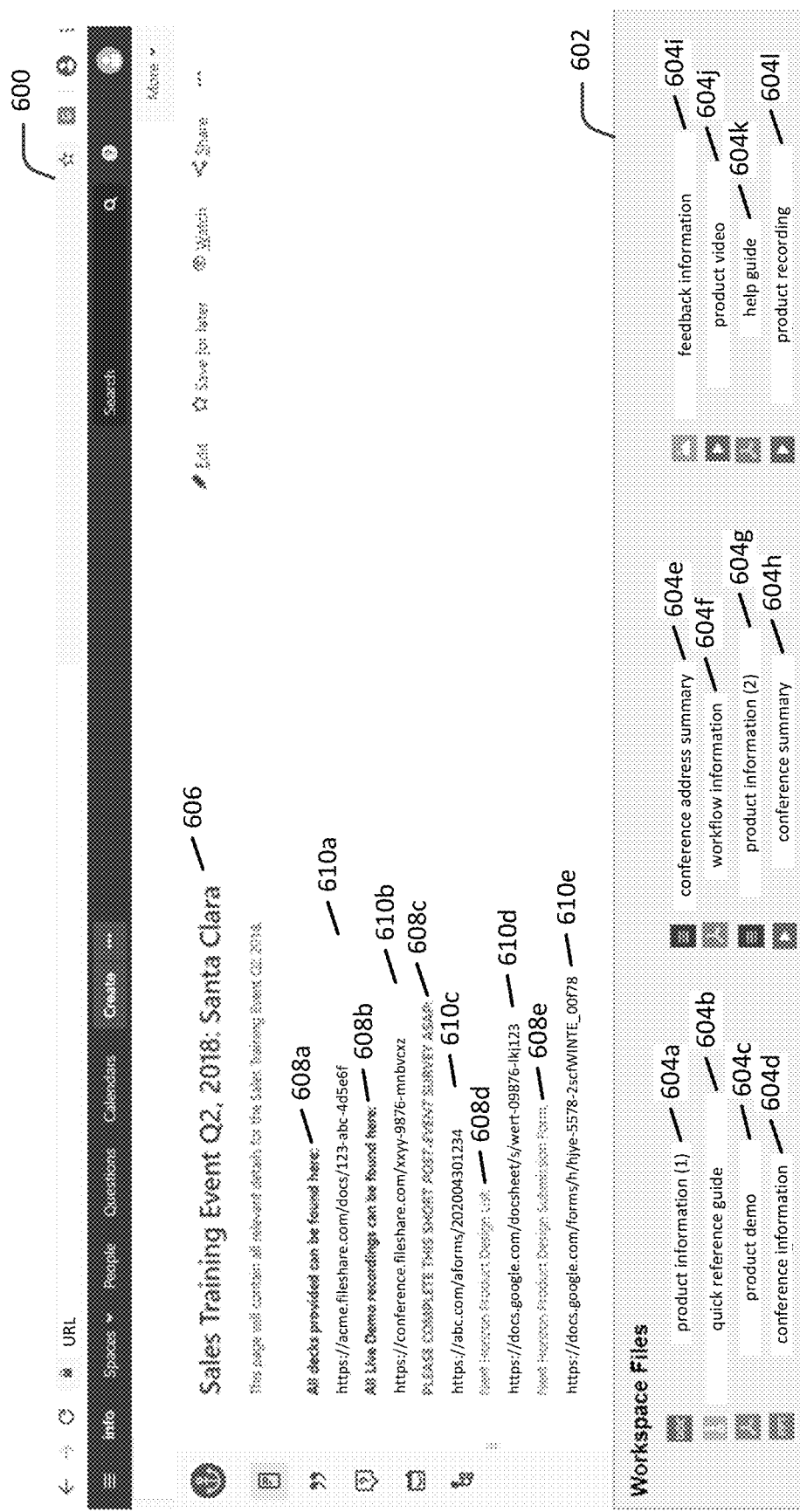
FIG. 6 is a diagram of an example page that includes a file zone displaying filenames, in accordance with an embodiment of the present disclosure.

File zone 602 may display some or all file information received from a file services connector (such as file services connector 506 in FIG. 5). As can be seen in FIG. 6, file zone 602 lists elements 604a-604l. Elements 604a-604l may be filenames of files that are mentioned or quoted on page 600 or on the subpages of page 600. The subpages are lower-level pages that are below page 600 and are accessible by clicking or tapping a link in page 600. By way of example, elements 604a and 604c may be filenames of files mentioned in subpage "https"//conference.fileshare.com/xxyy-9876-mnbvcxz" pointed to by element 610b, and elements 604b and 604d-604l may be filenames of files mentioned in subpage "https://acme.fileshare.com/docs/123-abc-4d5e6f" pointed to by element 610a.

In an embodiment, elements 604a-604l in file zone 602 may be links that point to or reference the files. Displaying elements 604a-604l as links in this manner allows a user (e.g., user 426 in FIG. 5) to click or tap any of elements 604a-604l in file zone 602 to directly access the file without having to scroll through the contents of page 600 find a link to a subpage, click or tap the link to access the subpage, and then scroll through the contents of the subpage to locate the file. In this manner, displaying and providing direct access to files mentioned or quoted in the page 600 or on the subpages of page 600 provide user 426 an improved user experience.

While the example file zone 602 of FIG. 6 lists 12 elements, it will be appreciated that more or fewer filenames may be listed in file zone 602. For example, the number of filenames to include in a file zone may be based upon a variety of factors including, but not limited to, the number of links in the contents of page 600, the total number of files, the preference for file types based on the user's history and/or learned preference, and the number of subpages. In certain implementations, depending on the number of filenames, file zone 602 may include a scroll bar for use in viewing the filenames in file zone 602.

Figure 7:
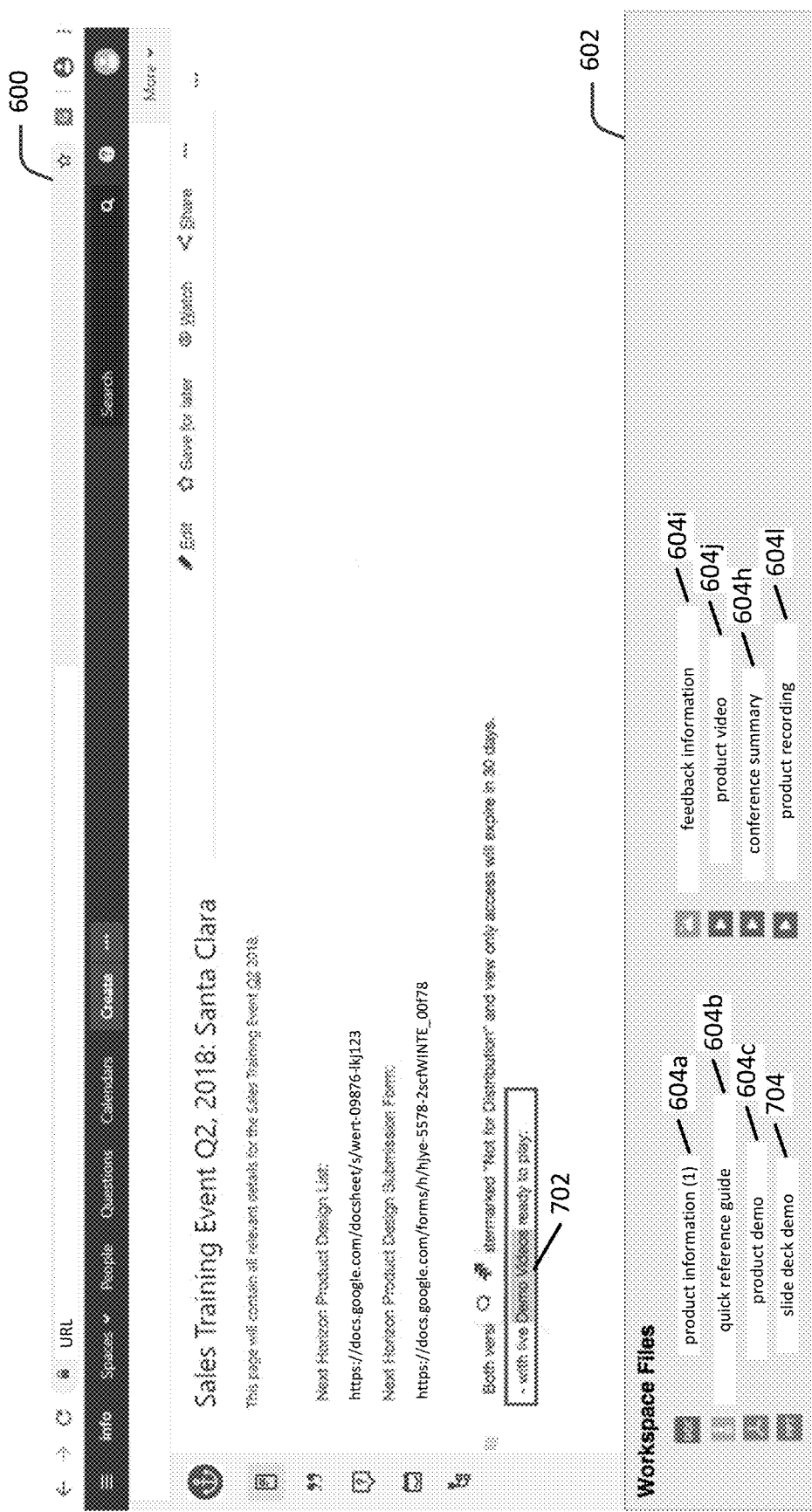
FIG. 7 is a diagram of an example page that includes a file zone displaying filenames related to a focus topic, in accordance with an embodiment of the present disclosure.

Referring now to FIG. 7, an example of a filtered file zones will be described. As can be seen in FIG. 7, user 426 may have scrolled down to a lower portion of page 600 and highlighted the text "Demo Videos" (see reference numeral 702 in FIG. 7). Based on this monitored behavior of user 426, content agent 504 may determine that the focus topic is "demonstration videos" and thus filter elements 604a-604l listed in file zone 602 to emphasize the filenames of the files that are related to the focus topic "demonstration videos". For instance, as can be seen, content agent 504 may determine that the files pointed to by elements 604a-604c, 604h-604j, and 604l are related to the focus topic "demonstration videos". Content agent 504 may also determine that a file pointed to by an element 704 is related to the focus topic "demonstration videos". As a result, content agent 504 can list elements 604a-604c, 604h-604j, 604l, and 704 in file zone 602 to emphasize the filenames of the files. Note that the filenames of files that are not related to the focus topic "demonstration videos", such as elements 604d-604g and 604k are no longer listed in file zone 602.

Figure 8:
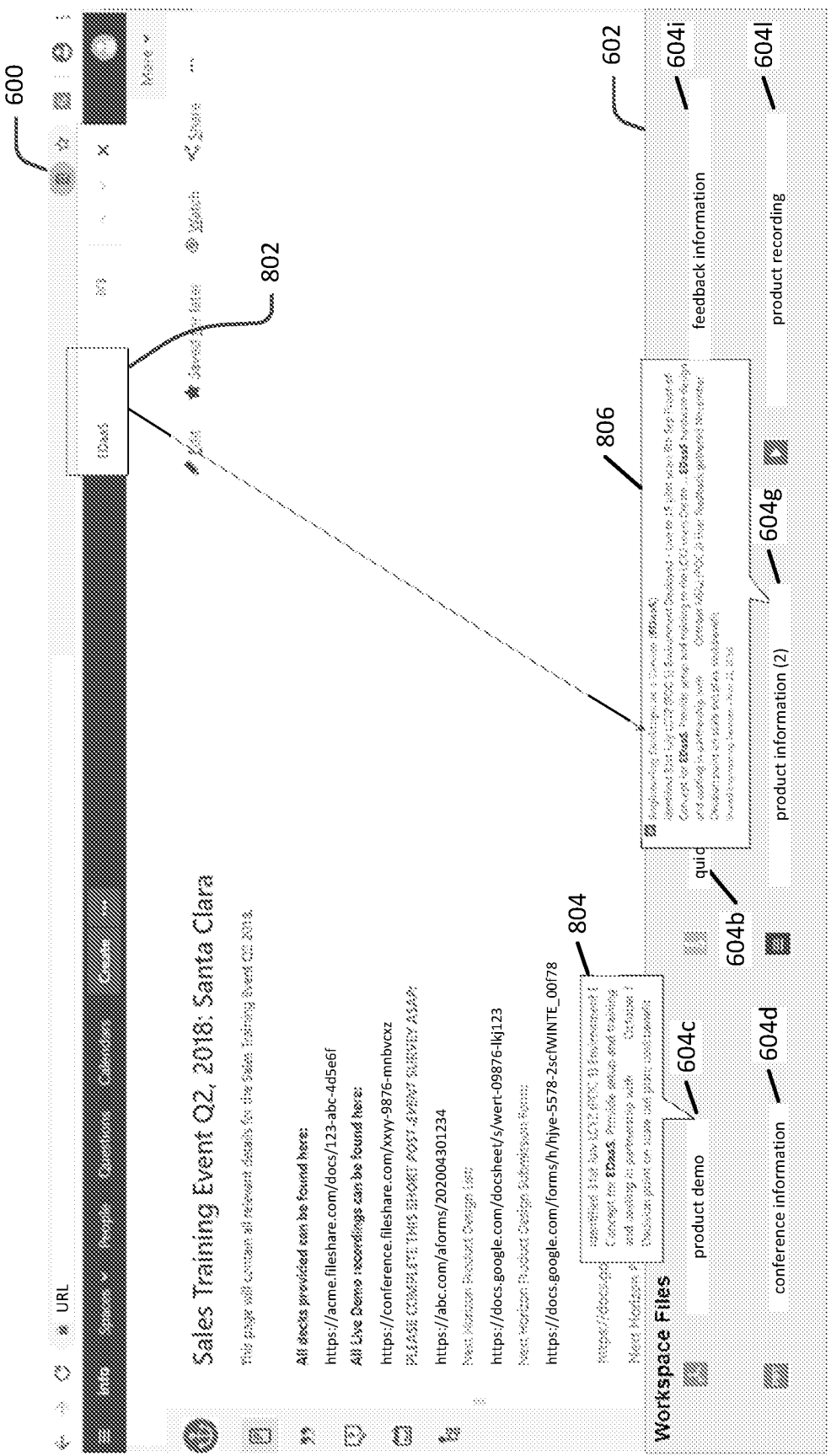
FIG. 8 is a diagram of the example page of FIG. 6 that includes a file zone displaying filenames, in accordance with an embodiment of the present disclosure.

As another example, as can be seen in FIG. 8, user 426 may have searched for the term "EDaaS" using a search box 802 provided in page 600. Based on this monitored behavior of user 426, content agent 504 can determine that the focus topic is "EDaaS" or "Enterprise Data as a Service" and filter elements 604a-604l listed in file zone 602 of FIG. 6 to emphasize the filenames of the files that are related to the focus topic "EDaaS" or "Enterprise Data as a Service". For instance, as can be seen in FIG. 8, content agent 504 may determine that the files pointed to by elements 604b-604d, 604g, 604i, and 604l are related to the focus topic "EDaaS" or "Enterprise Data as a Service". As a result, content agent 504 can list elements 604b-604d, 604g, 604i, and 604l in file zone 602 to emphasize the filenames of the files. Note that the filenames of files that are not related to the focus topic "EDaaS" or "Enterprise Data as a Service", such as elements 604a, 604e, 604f, 604h, 604j, and 604k are no longer listed in file zone 602.

As can be seen in FIG. 8, page 600 may also display callout boxes 804 and 806. For example, callout box 804 may be displayed when user 426 moves or hovers a pointer over or proximate to element 604c. Callout box 804 may provide a summary of the contents of the file indicative of element 604c. In some cases, callout box 804 may provide contents from the file that are related to the focus topic. Similarly, callout box 806 may be displayed when user 426 moves or hovers a pointer over or proximate to element 604g. Callout box 806 may provide a summary of the contents of the file indicative of element 604g and, in some cases, contents from the file that are related to the focus topic.

Figure 9:
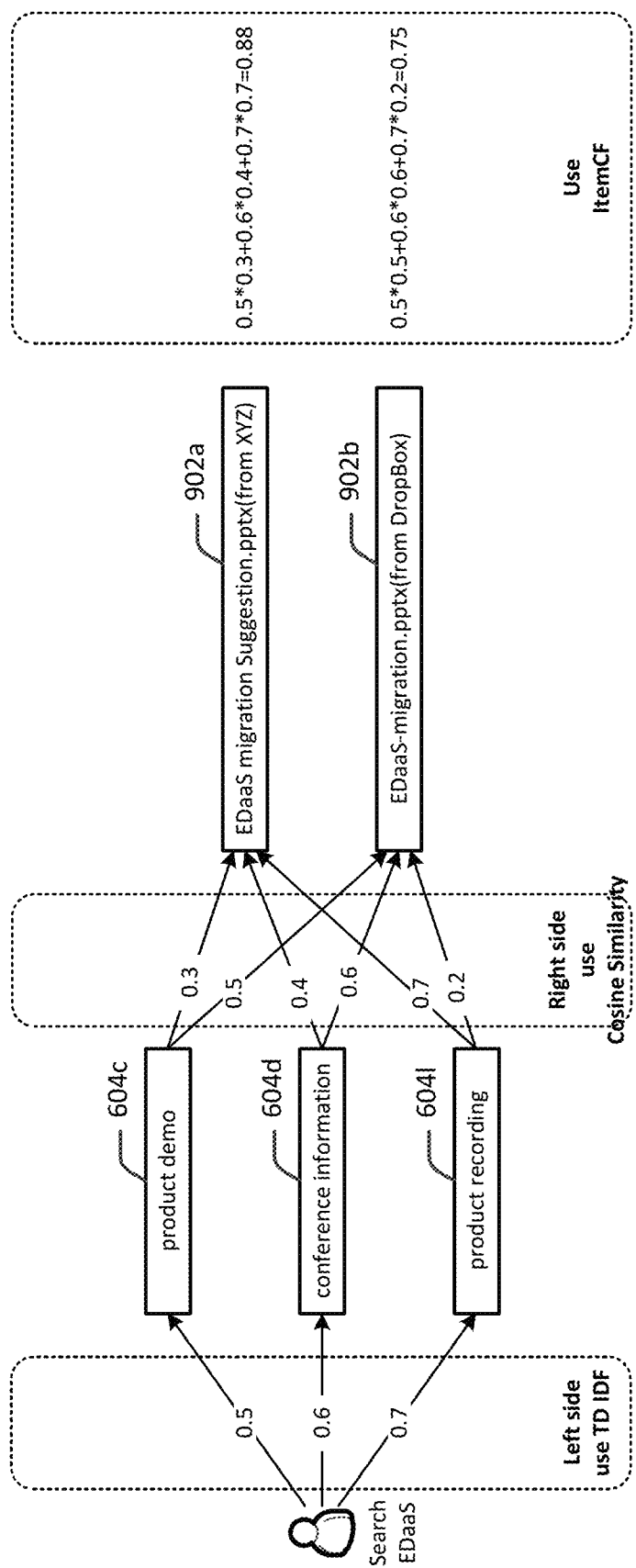
FIG. 9 is a diagram showing an example computation of item collaborative filtering (ItemCF) scores for files, in accordance with an embodiment of the present disclosure.

Referring now to FIG. 9, as noted above, recommendation service 512 may rank the recommended files based on the cosine similarity of the ItemCFs of the recommended files and the tf-idf of the files identified by the filenames listed in file zone 602. In the example of FIG. 9, the filenames are represented by elements 604c, 604d, and 604l listed in file zone 602 as shown in FIG. 8 discussed previously. As can be seen in FIG. 9, recommendation service 512 may compute a tf-idf score of 0.5 for the file identified by element 604c ("product demo"), a tf-idf score of 0.6 for the file identified by element 604d ("conference information"), and a tf-idf score of 0.7 for the file identified by element 604l ("product recording").

Still referring to the example of FIG. 9, the indicated preference of user 426 may have been for demonstration ("Demo") files regarding the indicated focus topic. Based on the preference for demonstration files, recommendation service 512 may have determined that filenames indicated by elements 902a and 902b are to be recommend to user 426. As can be seen in FIG. 9, recommendation service 512 may compute cosine similarities of 0.3, 0.4, and 0.7 between the file identified by element 902a ("EDaaS migration Suggestion.pptx (from XYZ)") and files identified by elements 604c, 604d, and 604l, respectfully. Similarly, recommendation service may compute cosine similarities of 0.5, 0.6, and 0.2 between the file identified by element 902b ("EDaaS migration.pptx (from DropBox)") and files identified by elements 604c, 604d, and 604l, respectfully.

As can be seen in FIG. 9, recommendation service 512 may compute an Item CF score of 0.88 (0.5·0.3+0.6·0.4+0.7·0.7=0.88) for the file identified by element 902a and an ItemCF score of 0.75 (0.5·0.5+0.6·0.6+0.7·0.2=0.75) for the file identified by element 902b. Based on the computed ItemCF scores, recommendation service 512 can send or otherwise provide a ranked list of recommended filenames to content agent 504. Note that a file having a higher ItemCF score is more relevant than a file having a lower Item CF score.

In some embodiments, recommendation service 512 may retrieve [9] the files to recommend from an indexed data store 516 of cloud computing environment 414. For example, as can be seen in FIG. 5, a content indexing and analyzing service 514 of cloud computing environment 414 may retrieve or otherwise obtain [12] contents, including files, from content sources (e.g., data sources 508). In an implementation, content indexing and analyzing service 514 can use authentication service 510 to retrieve the contents from data sources 508. Content indexing and analyzing service 514 can then index the retrieved contents in a way that allows the contents to be searched. For example, the words in the contents can be tokenized into word arrays, where occurrences of words indicate relevancy. Once indexed, content indexing and analyzing service 514 may store [13] the indexed contents in data store 516. Providing indexed contents in this manner allows for computationally efficient retrieval and searching of contents. Recommendation service 512 may then search the indexed contents in data store 516 to identify the files to recommend to user 426. Recommendation service 512 can send a ranked list of recommended filenames (i.e., filenames of recommended files) to content agent 504.

Figure 10:
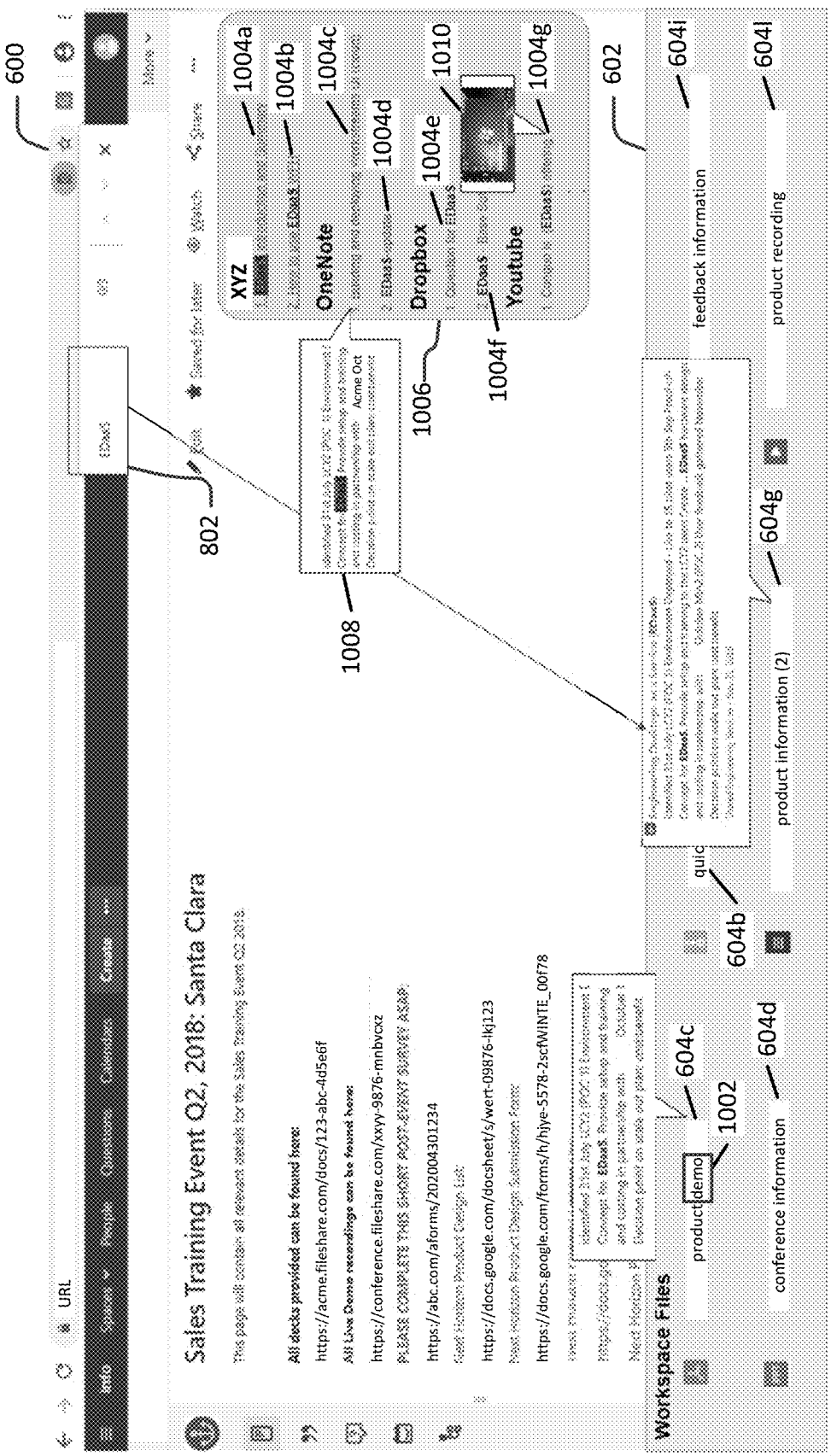
FIG. 10 is a diagram of the example page of FIG. 6 that includes multiple file zones, in accordance with an embodiment of the present disclosure.

As can be seen in FIG. 10, user 426 may have highlighted the text "Demo" (see reference numeral 1002 in FIG. 10) of element 604c which was emphasized to user 426 based on user 426 search for the term "EDaaS" (refer to reference numeral 802 in FIG. 10). Based on this monitored behavior of user 426, content agent 504 (FIG. 5) can determine that the preference of user 426 is for demonstration files. More specifically, content agent 504 can determine that the preference is for demonstration files regarding the focus topic "EDaaS". In response to a request for recommended content based on the learned preference for demonstration files regarding EDaaS, content agent 504 may have received from recommendation service 512 the filenames indicative of elements 1004a-1004f. Content agent 504 can then display elements 1004a-1004f in page 600 for viewing by user 426. For instance, as can be seen in FIG. 10, content agent 504 can list elements 1004a-1004f in another file zone 1006. In an embodiment, elements 1004a-1004f listed in file zone 1006 may be links that point to or reference the files. In an embodiment, elements 1004a-1004f may be listed in accordance to their relevancy to the focus topic.

Still referring to FIG. 10, callout boxes may be displayed for elements 1004a-1004f listed in files zone 1006. For example, a callout box 1008 may be displayed when user 426 moves or hovers a pointer over or proximate to element 1004c. Callout box 1008 may provide a summary of the contents of the file indicative of element 1004c. In some cases, callout box 1008 may provide contents from the file that are related to the focus topic. Similarly, callout box 1010 may be displayed when user 426 moves or hovers a pointer over or proximate to element 1004g. Callout box 1010 may provide a thumbnail or mini player of the video contents of the file indicative of element 1004g.

Figure 11:
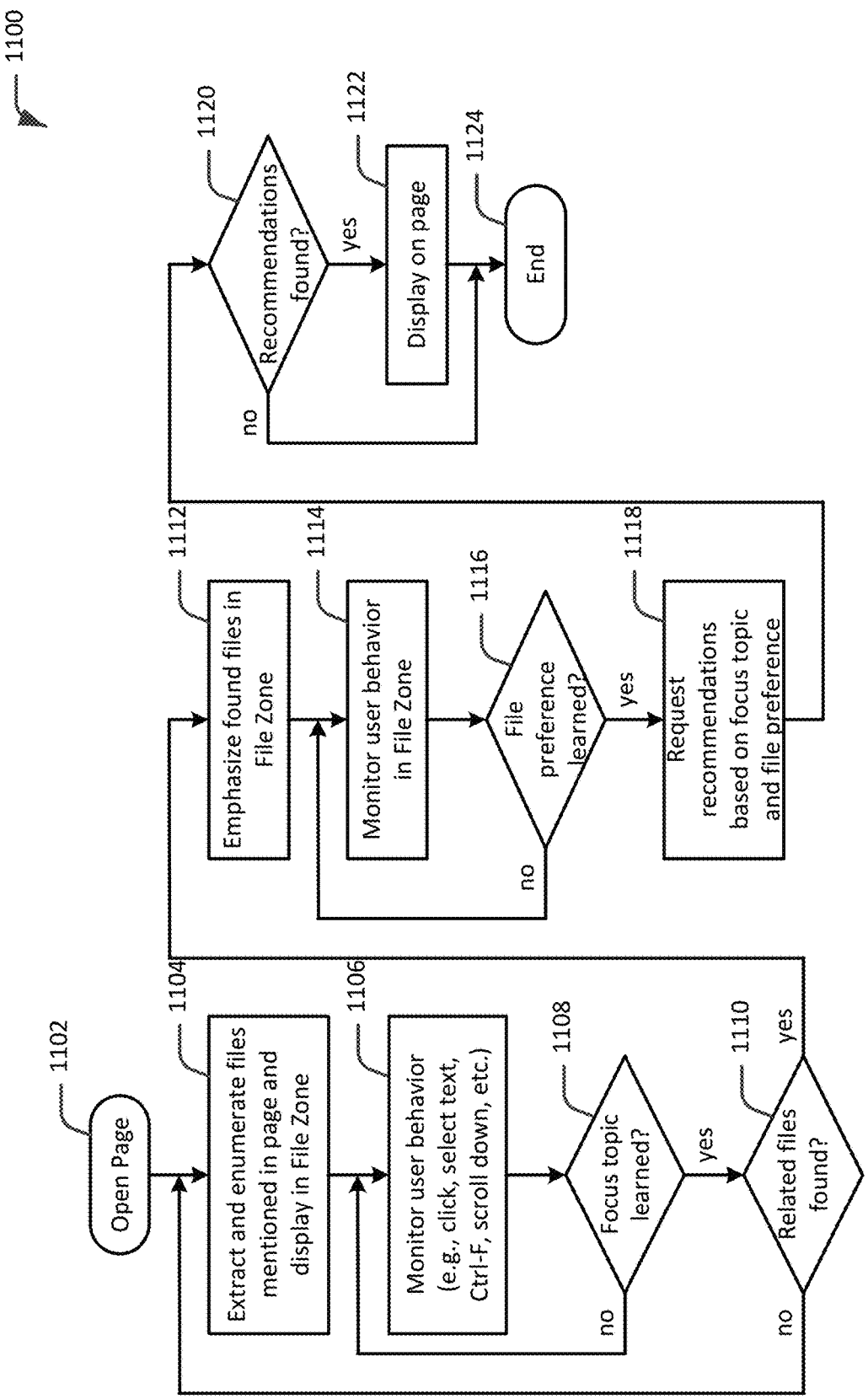
FIG. 11 is a flow diagram of an example process for personalizing pages, in accordance with an embodiment of the present disclosure.

FIG. 11 is a flow diagram of an example process 1100 for personalizing pages, in accordance with an embodiment of the present disclosure. Example process 1100 may be implemented or used within a computing environment or system such as those disclosed above at least with respect to FIG. 2, FIG. 3, FIGS. 4A-4C and/or FIG. 5. For example, in some embodiments, the operations, functions, or actions illustrated in example process 1100 may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102a-102n of FIG. 3 and/or clients 202 of FIGS. 4A-4C). In some embodiments, example process 1100 may be implemented by application software, such as resource access application 424, which may run on a suitable computing device, such as computing device 100 of FIG. 2, client machines 102a-102n of FIG. 3, and/or clients 202 of FIGS. 4A-4C. For example, the operations, functions, or actions described in the respective blocks of example process 1100 may be implemented by applications 116 and/or data 117 of computing device 100.

With reference to FIG. 11, process 1100 is initiated at 1102 where a user may use a client application running on a computing device to open a page, such as a SaaS application page. The client application can render the opened page on a display of the computing device. At 1104, the client application can extract and enumerate the files mentioned on the page. For example, the client application can display the filenames of these files in a file zone in the displayed page. The client application can also extract and enumerate the files mentioned on subpages of the page.

At 1106, the client application can monitor the user's behavior in interacting with the displayed page to learn the focus topic or topics of the user. At 1108, the client application can make a determination as to whether it has learned a focus topic for the user based on the monitored user behavior. If a focus topic has not been learned, the client application can continue to monitor the user's behavior in interacting with the displayed page at 1106.

Otherwise, if a focus topic has been learned, then, at 1110, the client application can check the files identified by the filenames listed in the file zone for files related to the focus topic. If no files identified by the filenames listed in the file zone are determined to be related to the focus topic, the client application can continue to extract and enumerate the files mentioned on the page at 1104.

Otherwise, if one or more files identified by the filenames in the file zone are determined to be related to the focus topic, then, at 1112, the client application can emphasize the filenames of the related files in the file zone. For example, the client application can emphasize the filenames of the related files by displaying only these filenames in the file zone. In other words, the filenames of files that are not related to the focus topic can be removed from (i.e., no longer displayed) the file zone.

At 1114, the client application can monitor the user's behavior in interacting with the filenames displayed in the file zone to learn the user's preference with regard to the files identified by the filenames. At 1116, the client application can make a determination as to whether it has learned a file preference for the user based on the monitored user behavior. For example, the client application may learn that the user has a preference for a specific type of file. As another example, the client application may learn that the user has a preference for files provided by a particular file provider or server. If a file preference has not been learned, the client application can continue to monitor the user's behavior in interacting with the displayed file zone at 1104.

Otherwise, if a file preference has been learned, then, at 1118, the client application can make a request for content recommendations based on the learned focus topic and file preference. The request may be made to a recommendation service for filenames of files that are related to the learned focus topic and file preference of the user. Upon receiving the request, the recommendation service may check third-party applications for files that are related to the indicated focus topic and file preference. These third-party applications may be SaaS or web applications that are accessible via an SSO of the user.

At 1120, the client application can check to determine whether recommendations are found. For example, the check may be to determine whether recommended content has been received from the recommendation service. If no recommendations are found, process 1100 may end at 1124.

Otherwise, if recommendations are found, then, at 1122, the client application may display the recommendations in the displayed page. For example, the filenames of the recommended files may be displayed in a file zone in the displayed page. In some cases, the filenames may be displayed as a ranked or ordered list based on relevancy to the focus topic and/or file preference. Process 1100 may then end at 1124.

Further Example Embodiments

The following examples pertain to further embodiments, from which numerous permutations and configurations will be apparent.

Example 1 includes a method including: displaying, by a computing device, a plurality of elements in a page; monitoring, by the computing device, interaction with the displayed page; and, responsive to determining, by the computing device, a topic based on the interaction with at least one of the plurality of elements in the displayed page, identifying one or more files related to the identified topic; and providing an element on the page, the element configured to provide access to one of the identified one or more files in response to an input received on the element.

Example 2 includes the subject matter of Example 1, wherein the element is provided in a file zone in the displayed page.

Example 3 includes the subject matter of any of Examples 1 and 2, wherein identifying one or more files related to the identified topic is based on a term frequency-inverse document frequency.

Example 4 includes the subject matter of any of Examples 1 through 3, further including: detecting, by the computing device, user interaction with a filename of a file of the one or more files related to the identified topic; requesting, by the computing device, recommendations based on the topic and the interacted filename; receiving, by the computing device, one or more filenames of one or more recommended files; and displaying, by the computing device, the one or more filenames of the recommended one or more files in a file zone in the displayed page.

Example 5 includes the subject matter of Example 4, wherein the recommended one or more files are from applications accessible by a single sign-on (SSO) of the user.

Example 6 includes the subject matter of any of Examples 4 and 5, wherein the recommended one or more files are determined using a content collaborative filtering (CF) technique.

Example 7 includes the subject matter of any of Examples 4 through 6, wherein the one or more filenames are displayed as an ordered list based on relevancy of the one or more files to the identified topic.

Example 8 includes a system including a memory and one or more processors in communication with the memory and configured to: display a plurality of elements in a page; monitor interaction with the displayed page; and, responsive to determination of a topic based on the interaction with the displayed page, identify one or more files related to the identified topic; and provide an element on the page, the element configured to provide access to one of the identified one or more files in response to an input received on the element.

Example 9 includes the subject matter of Example 8, wherein the element is provided in a file zone in the displayed page.

Example 10 includes the subject matter of any of Examples 8 and 9, wherein to identify one or more files related to the identified topic is based on a term frequency-inverse document frequency.

Example 11 includes the subject matter of any of Examples 8 through 10, wherein the one or more processors are further configured to: detect user interaction with a filename of a file of the one or more files related to the identified topic; request for recommendations based on the topic and the interacted filename; receive one or more filenames of one or more recommended files; and display the one or more filenames of the one or more recommended files in a file zone in the displayed page.

Example 12 includes the subject matter of Example 11, wherein the recommended one or more files are from applications accessible by a single sign-on (SSO) of the user.

Example 13 includes the subject matter of any of Examples 11 and 12, wherein the recommended one or more files are determined using a content collaborative filtering (CF) technique.

Example 14 includes the subject matter of any of Examples 11 through 13, wherein the one or more filenames are displayed as an ordered list based on relevancy of the one or more files to the identified topic.

Example 15 includes a method including: displaying, by a computing device, a plurality of elements in a page, at least one element of the plurality of elements configured to provide access to a subpage of the page; retrieving, by the computing device from a file services connector, at least one filename of at least one file via the element; and displaying, by the computing device, the at least one filename of the at least one file in the displayed page such that contents of the at least one file is accessible in response to input received on the at least one filename.

Example 16 includes the subject matter of Example 15, wherein retrieving the at least one filename is via an input on the at least one element displayed on the page.

Example 17 includes the subject matter of any of Examples 15 and 16, wherein displaying the at least one filename includes listing the at least one filename in a file zone in the displayed page.

Example 18 includes the subject matter of Example 17, further including: monitoring, by the computing device, interaction with the displayed page; and responsive to determining, by the computing device, a topic based on the interaction with the displayed page, filtering the at least one filename in the file zone based on the identified topic.

Example 19 includes the subject matter of Example 18, further including: detecting, by the computing device, user interaction with a filename of a file listed in the file zone; requesting, by the computing device, recommendations based on the topic and the interacted filename; receiving, by the computing device, one or more filenames of one or more recommended files; and displaying, by the computing device, the one or more filenames of the one or more recommended files in the file zone or in a different file zone in the displayed page.

Example 20 includes the subject matter of Example 19, wherein the one or more filenames of the one or more recommended files are displayed as a ranked list based on relevancy to the identified topic.

Example 21 includes the subject matter of any of Examples 19 and 20, wherein the recommended one or more files are from applications accessible by a single sign-on (SSO) of the user.

Example 22 includes the subject matter of any of Examples 19 through 21, wherein the recommended one or more files are determined using a content collaborative filtering (CF) technique.

Example 23 includes a system including a memory and one or more processors in communication with the memory and configured to: display a plurality of elements in a page, at least one element of the plurality of elements configured to provide access to a subpage of the page; retrieve at least one filename of at least one file via the element; and display the at least one filename of the at least one file in the displayed page such that contents of the at least one file is accessible in response to input received on the at least one filename.

Example 24 includes the subject matter of Example 23, wherein to retrieve the at least one filename is via an input on the at least one element displayed on the page.

Example 25 includes the subject matter of any of Examples 23 and 24, wherein to display the at least one filename includes to list the at least one filename in a file zone in the displayed page.

Example 26 includes the subject matter of Example 25, further including: monitoring, by the computing device, interaction with the displayed page; and responsive to determining, by the computing device, a topic based on the interaction with the displayed page, filtering the at least one filename in the file zone based on the identified topic.

Example 27 includes the subject matter of Example 26, wherein the one or more processors are further configured to: detect user interaction with a filename of a file listed in the file zone; request recommendations based on the topic and the interacted filename; receive one or more filenames of one or more recommended files; and display the one or more filenames of the one or more recommended files in the file zone or in a different file zone in the displayed page.

Example 28 includes the subject matter of Example 27, wherein the one or more filenames of the one or more recommended files are displayed as a ranked list based on relevancy to the identified topic.

Example 29 includes the subject matter of any of Examples 27 and 28, wherein the recommended one or more files are from applications accessible by a single sign-on (SSO) of the user.

Example 30 includes the subject matter of any of Examples 27 through 29, wherein the recommended one or more files are determined using a content collaborative filtering (CF) technique.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
   displaying, by a computing device, a page comprising a plurality of elements;
   monitoring, by the computing device, interaction with at least one element of the plurality of elements in the displayed page;
   determining, by the computing device, a topic based on the monitored interaction with the at least one element of the plurality of elements in the displayed page;
   responsive to determining the topic;
   identifying one or more files related to the determined topic; and
   re-rendering the displayed page, the re-rendered displayed page including a filename of a file of the identified one or more files, the filename configured to provide access to the file in response to an input received on the filename;
   detecting, by the computing device, user interaction with the filename;
   requesting, by the computing device, recommendations based on the topic and the filename in response to the detected user interaction;
   receiving, by the computing device, one or more filenames of one or more recommended files in response to the requested recommendations; and
   re-rendering, by the computing device, the re-rendered displayed page to include the one or more filenames of the one or more recommended files in a file zone in the re-rendered displayed page.

2. The method of claim 1, wherein the filename is provided in the file zone.

3. The method of claim 1, wherein identifying one or more files related to the determined topic is based on a term frequency-inverse document frequency.

4. The method of claim 1, wherein the recommended one or more files are from applications accessible by a single sign-on (SSO) of the user.

5. The method of claim 1, wherein the recommended one or more files are determined using a content collaborative filtering (CF) technique.

6. The method of claim 1, wherein the one or more filenames of the recommended one or more files are displayed in the file zone as an ordered list based on relevancy of the recommended one or more files to the determined topic.

7. A system comprising:
   a memory; and
   one or more processors in communication with the memory and configured to;
   display a page comprising a plurality of elements;
   monitor interaction with at least one element of the plurality of elements in the displayed page;
   determine a topic based upon the monitored interaction with the at least one element of the plurality of elements in the displayed page;
   responsive to determination of the topic;
   identify one or more files related to the determined topic; and
   re-render the displayed page, the re-rendered displayed page including a filename of a file of the identified one or more files, the filename configured to provide access to the file in response to an input received on the filename;
   detect user interaction with the filename;
   request for recommendations based on the topic and the filename in response to the detected user interaction;
   receive one or more filenames of one or more recommended files in response to the requested for recommendations; and
   re-render the re-rendered displayed page to include the one or more filenames of the one or more recommended files in a file zone in the re-rendered displayed page.

8. The system of claim 7, wherein the filename is provided in the file zone.

9. The system of claim 7, wherein to identify one or more files related to the determined topic is based on a term frequency-inverse document frequency.

10. The system of claim 7, wherein the recommended one or more files are from applications accessible by a single sign-on (SSO) of the user.

11. The system of claim 7, wherein the recommended one or more files are determined using a content collaborative filtering (CF) technique.

12. The system of claim 7, wherein the one or more filenames are displayed in the file zone as an ordered list based on relevancy of the one or more files to the determined topic.

13. A method comprising:
   displaying, by a computing device, a page comprising a plurality of elements, at least one element of the plurality of elements configured to provide access to a subpage of the page;
   monitoring, by the computing device, interaction with at least one element of the plurality of elements in the displayed page;
   determining, by the computing device, a topic based on the monitored interaction with the at least one element of the plurality of elements in the displayed page;
   responsive to determining the topic:
   identifying one or more files related to the determined topic; and
   re-rendering, by the computing device, the displayed page, the re-rendered displayed page including a filename of a file of identified one or more files such that contents of the file is accessible in response to input received on the filename;
   detecting, by the computing device, user interaction with the filename;
   requesting, by the computing device, recommendations based on the topic and the filename in response to the detected user interaction;
   receiving, by the computing device, one or more filenames of one or more recommended files in response to the requested recommendations; and
   re-rendering, by the computing device, the re-rendered displayed page to include the one or more filenames of the one or more recommended files in a file zone or in a different file zone in the re-rendered displayed page.

14. The method of claim 13, wherein the filename is retrieved via an input on the at least one element displayed on the page.

15. The method of claim 13, wherein the filename is provided in a file zone in the displayed page, wherein the file zone is configured to display one or more filenames of one or more files related to the determined topic.

16. The method of claim 13, wherein the one or more filenames of the one or more recommended files are displayed in the file zone as a ranked list based on relevancy of the recommended one or more files to the determined topic.

\* \* \* \* \*